United States Patent [19]

Makishima et al.

[11] 4,202,556
[45] May 13, 1980

[54] SEALING MEANS

[75] Inventors: Mamoru Makishima, Aichi; Koyu Yamasaki, Obu, both of Japan

[73] Assignee: Mitsubishi Jukogyo Kabushiki Kaisha, Japan

[21] Appl. No.: 912,214

[22] Filed: Jun. 5, 1978

[30] Foreign Application Priority Data

Jun. 10, 1977 [JP] Japan .............................. 52-74860[U]

[51] Int. Cl.² .............................................. F16J 15/08
[52] U.S. Cl. ..................................... 277/190; 277/236; 277/167.5
[58] Field of Search ............... 277/236, 167.5, 190, 277/1

[56] References Cited

U.S. PATENT DOCUMENTS

| | | | |
|---|---|---|---|
| 2,634,145 | 4/1953 | Monahan | 277/236 |
| 3,257,119 | 6/1966 | Bialkowski | 277/236 |
| 3,411,812 | 11/1968 | Prince et al. | 277/236 |
| 3,942,808 | 3/1976 | Gross | 277/236 |
| 4,039,741 | 8/1977 | Havens | 277/236 |

Primary Examiner—Robert I. Smith
Attorney, Agent, or Firm—McGlew and Tuttle

[57] ABSTRACT

This is a sealing means to form a tight seal between two members opposed to each other, one of which has a flat contact surface formed for contacting one end of a frustoconical metal gasket. The other member is provided with a groove opening toward the contact surface, hold the metal gasket on the other end portion within the groove and is also provided with a wall surface for contacting the surface of the first sealing end. The wall surface is arranged as required so as to be movable in the direction in which the sealing force acts.

9 Claims, 13 Drawing Figures

SEALING MEANS

The present invention relates to sealing means for metal gaskets and more particularly to sealing means for large caliber vacuum gate valves to be used for nuclear fusion, gate valves for high temperatures, gate valves for low temperatures, flanges and the like.

This kind of conventional sealing means is formed as illustrated in FIGS. 1 to 3. Those figures show a valve comprising a valve seat b provided at the lower end of a valve case a and a valve plate d which can move up and down within the valve case a Rectangular grooves e and f are formed respectively in the valve seat b and valve plate d and a truncated conical tubular metal gasket h is supported by an annular gasket presser g on the valve plate d. In the closed state illustrated in FIG. 3, the sealing parts $h_1$ and $h_2$ at both end edges, respectively, of the metal gasket h will engage with the corner parts $e_1$ and $f_1$ of the rectangular grooves e and f so as to be sealed.

However, in such sealing means, unless the precision of the positioning dimensions of the valve seat b and valve plate d is made very high, the edge of the sealing part $h_1$ at the lower end of the metal gasket h will ride on the projecting part $b_1$ of the valve seat b and the sealing will become impossible.

Further, the resiliency of the metal gasket h itself is to be utilized to absorb shocks, thermal strains and dimensional errors so that the entire body may be of a uniform load, that is, may conform. However, when the valve means is repeatedly opened and closed, a permanent deformation will be likely to be produced. If a permanent deformation is produced in the metal gasket h, the inside diameter of the lower end edge sealing part $h_1$ will become so small that the sealing part $h_1$ will be likely to ride on the projecting part $b_1$ of the valve seat b.

Further, it has been very difficult to surface-finish the rectangular grooves e and f to accurate shapes and dimensions.

Also, even in a conventional sealing means wherein a truncated conical tubular metal gasket m is engaged and sealed with a rectangular groove j of an upper flange i and a rectangular groove l of a lower flange k as illustrated in FIG. 4, the same difficulty as in the conventional sealing means illustrated in FIGS. 1 to 3 has proved to be unavoidable.

An object of the present invention is to provide a metal gasket sealing means easy to work and high in durability by avoiding the above-mentioned defect.

Therefore, the present invention is characterized in that one of two members opposed to each other in a sealing part has a flat contact surface formed for contacting one sealing end of a metal gasket and the other member is provided with a groove opening toward the contact surface, of the first member. The other end portion of the metal gasket is held within the groove, which is provided with a wall surface for contacting the surface of the gasket adjacent the first sealing end.

Further, the present invention is characterized in that the wall surface for contacting the gasket on the end surface of the sealing end is arranged so as to be movable in the direction in which the sealing force acts direction.

Other objects and features of the present invention will become clearer from the following description with reference to the drawings in which.

Figure 1:
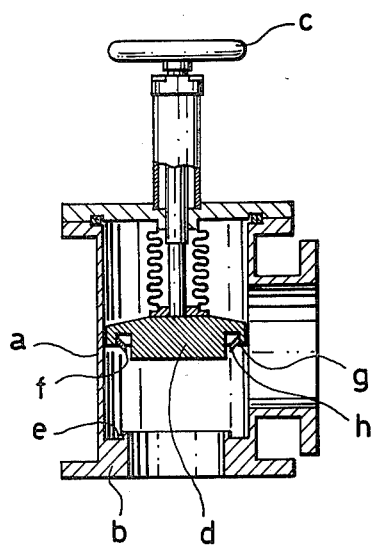
FIG. 1 is a vertically sectioned side view of a conventional sealing means.
Figure 4:
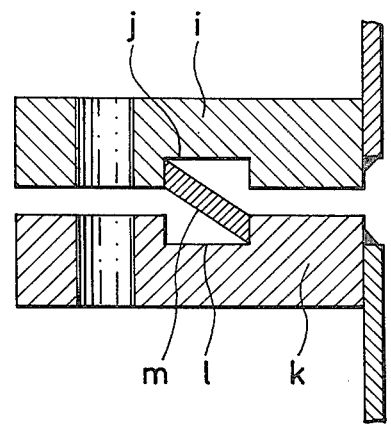
FIG. 4 is a vertically sectioned side view of an essential part of another conventional sealing means.
Figure 2:
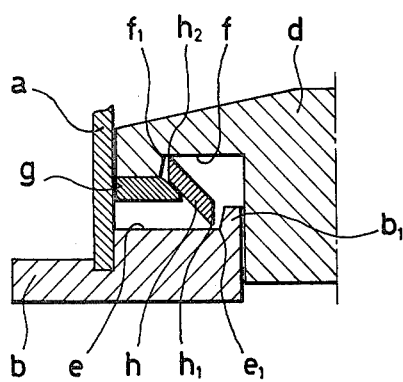
FIGS. 2 and 3 are magnified vertically sectioned side views of an essential part of the sealing means in FIG. 1.
Figure 3:
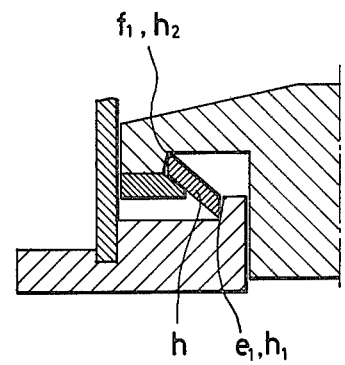
Figure 5:
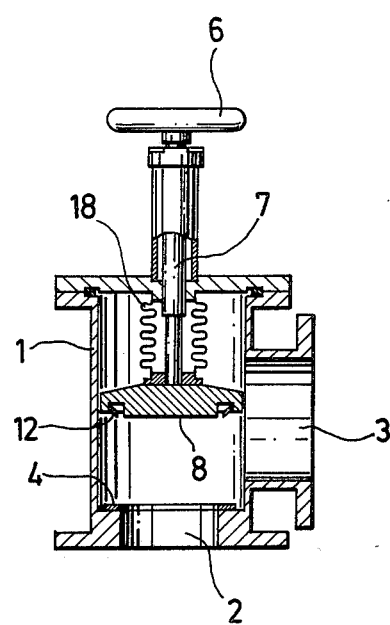
FIG. 5 is a vertically sectioned side view of a sealing means embodying the present invention.
Figure 6:
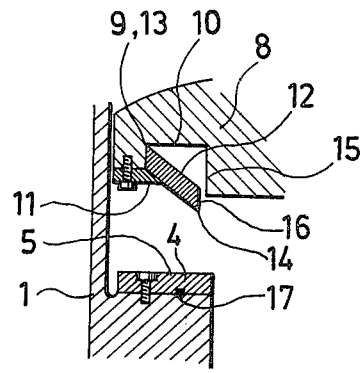
FIGS. 6 and 7 are magnified vertically sectioned side views of an essential part of the the sealing means in FIG. 5.
Figure 7:
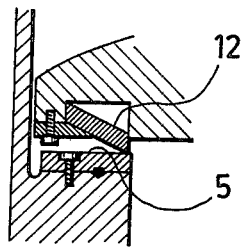

In FIGS. 5 to 7, reference numeral 1 indicates a valve case provided with a port 2 and a port 3 arranged in a direction at right angles with it. Reference numeral 4 indicates a valve seat replaceably fixed to the valve case 1 with such conventionally used means as, for example, screws and provided with a gasket contacting surface 5 formed to be flat. A valve plate 8 is provided with a shaft 7 within the valve case 1 so as to able to be moved up and down along the center axis of the port 2 by means of a handle 6. The plate 8 also has a rectangular groove 10 provided with a corner part 9 formed on the lower surface. Further, a metal gasket 12 is held in the valve plate 8 by a gasket presser 11. The gasket is formed as a truncated conical tubular members and its at the outside sealing end 13 engages the rectangular groove 10 of the valve plate 8. The gasket also has an inside sealing end 14, and the plate 8 has a wall surface 15 facing the rectangular groove 10. An end surface 16 of the inside sealing end 14 is pressed against the wall surface 15 when the valve is closed, and a gasket 17 is provided for preventing a leakage under the valve seat 4. A bellows 18 seals off the shaft 7 and is stretched between the inside surface of the valve case 1 and upper surface of the valve plate 8.

Figure 8:
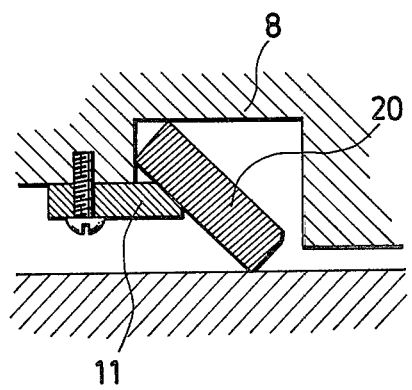
FIG. 8 is a magnified vertically sectioned side view of an essential part of another embodiment of the invention.

Now, if the valve plate 8 is pushed down by operating the handle 6 from the opened state shown in FIG. 6, the sealing end 14 of the truncated conical tubular metal gasket will first contact with the gasket contacting surface 5 of the valve seat 4. When the plate 8 is pushed farther down, as shown in FIG. 7, the tip of the metal gasket 12 will be pushed up and the end surface 16 of the inside sealing end 14 will contact the wall surface 15 that forms the inner to face of the rectangular groove 10. Therefore, at the same time, the outside sealing end 13 of the metal gasket will positively engage at the corner part 9 of the rectangular groove 10 and will be strongly held by the valve seat 4 and valve plate 8 to completely seal the valve. In normal usage, the valve seat 4 will be so strongly and repeatedly brought into contact with the metal gasket 12 as to be preferably made of a special material or coated on the surface with a hard material. The valve seat 4 need not always be of a replaceable structure. Further, the metal gasket need not have a parallelogram-shaped cross-section as in the above mentioned embodiment but may be a metal gasket 20 of a substantially rectangular cross-section as shown in FIG. 8.

Figure 9:
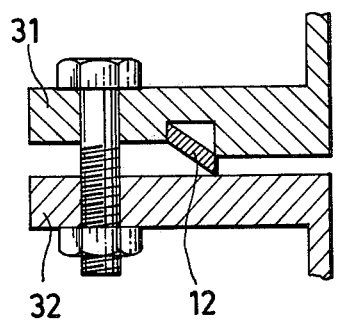
FIG. 9 is a magnified vertically sectioned side view of the above mentioned embodiment as applied to a flange.

FIG. 9 shows the above-mentioned embodiment as applied to a flange seal consisting of flanges 31 and 32 and a bolt 33.

Figure 10:
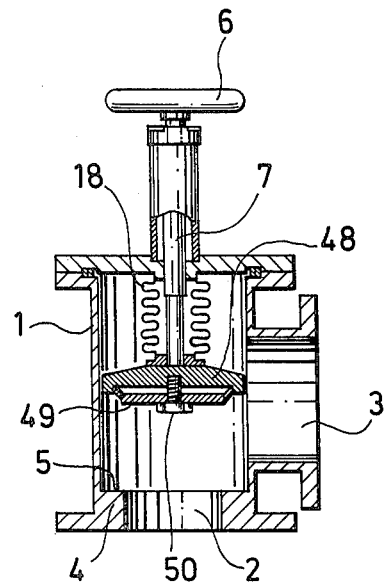
FIG. 10 is a vertically sectioned side view illustrating a sealing means of another embodiment of the present invention.
Figure 11:
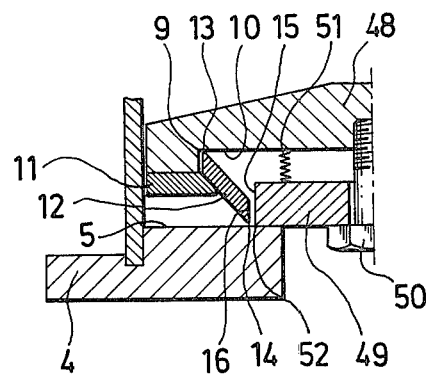
FIGS. 11 and 12 are magnified vertically sectioned side views of an essential part of the embodiment in FIG. 10.
Figure 12:
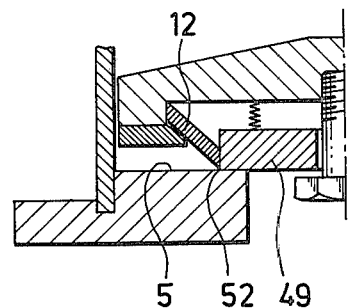

FIGS. 10 to 12 show another embodiment in which a valve plate 48 is provided in the center of the lower surface with a guide plate 49 which is held on the valve plate 48 by a a loosely fitted bolt 50 and is always pushed in the direction away from the valve plate 48 by a proper number of springs 51 interposed between the guide plate 49 and the valve plate 48. Reference numeral 52 indicates a corner part formed by the guide plate 49 and contacting flat surface 5. The same reference numerals as in the embodiment in FIGS. 5–7 are used to indicate members having the same structures and functions as in the embodiment in FIGS. 10–12 their explanation with therefore be omitted.

Now, if the handle 6 is operated to pull up the valve plate 48 by means of the shaft 7, the ports 2 and 3 will communicate with each other with a low resistance to gas flow, and the valve will be opened.

In this state, the guide plate 49 will have been pushed down by the resilient returning force of the springs 51 and will have been stopped by the head of the bolt 50.

If the handle 6 is operated in the reverse direction to push the valve plate 48 downwardly by means of the shaft 7, the guide plate 49 will first contact the lower surface with the gasket-contacting flat surface 5 of the valve seat 4 and a corner part 52 of a rectangular groove will be formed by the contacting flat surface 5 and guide plate 49. Then the inside sealing end 14 of the truncated conical tubular metal gasket 12 will contact the contacting flat surface 5 (See FIG. 11). Further, the metal gasket 12 will contact the above-mentioned corner parts 52 and 9 on the right and left at the inside and outside sealing ends 14 and 13 and, at the same time, will press the end surface 16 of the inside sealing end 14 against the wall surface 15 of the guide plate 49. The gasket will be guided to be in a proper position by the play provided between the bolt 50 and guide plate 49 and the valve seat 4 will be completely sealed to the valve plate 48, as shown in FIG. 12.

Figure 13:
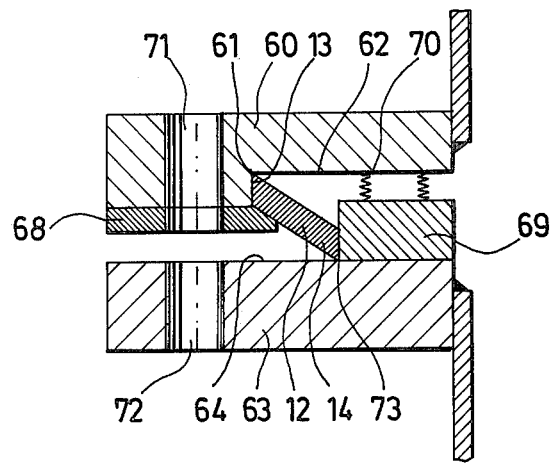
FIG. 13 is a magnified vertically sectioned side view of an essential part of the same embodiment as applied to flanges.

FIG. 13 shows the embodiment in FIGS. 10 to 12 as applied to sealing flanges. In the drawings, reference numeral 60 indicates an upper flange having a rectangular groove 62 provided with a corner part 61 formed on the lower surface. A lower flange 63 juxtaposed with respect to the upper flange 60 is formed to be flat on the upper surface 64.

Further, the truncated conical tubular metal gasket 12 is supported in the above mentioned upper flange 60 by an annular gasket presser 68 so that the outside sealing end 13 engages the rectangular groove 61 of the upper flange 60.

A guide plate 69 to guide the truncated conical tubular metal gasket 12 at the inside sealing end 14 is fitted to the upper flange 60 through springs 70.

As the embodiment illustrated in FIG. 13 is formed as mentioned above, if the guide plate 69 is mounted on the gasket contacting flat surface 64 of the lower flange 63, and bolts (not illustrated) are passed through bolt holes 71 and 72, respectively, of the upper and lower flanges 60 and 63 and nuts are screwed onto the bolts, the sealing ends 13 and 14 of the metal gasket 12 will be pressed into contact respectively with the corner part 61 of the rectangular groove 62 of the upper flange and with a corner part 73 of a rectangular groove formed by the gasket contact flat surface 64 and guide plate 69, the gap between the flanges 60 and 63 will be thus sealed.

As described above, according to the present invention, one of the two members members opposed to each other and which are to be sealed together has a flat sealing surface for making sealing contact with--1 a metal gasket while the other of the two members is provided with a groove located in a position opposed to said sealing surface. One end of a metal gasket is held in the groove so that the sealing end of the gasket makes contact with the sealing surface. The groove is provided with a wall surface to contact the metal gasket adjacent the end surface of the sealing end and, as required, the wall surface may be provided so as to be movable in the direction in which the sealing force acts.

Therefore, the valve seat is of a simple flat surface, is easy to surface-finish. The valve seat is made replaceable so that such special material as, for example, a superhard metal may be used and can be further superfinished. Further, the resiliency of the metal gasket can be utilized. Therefore, the life of the valve seat and metal gasket can be greatly increased. Even if a permanent deformation is produced in the metal gasket, no improper operation of the valve will be immediately caused. Particularly, in case the wall surface is made movable, even if the metal gasket is somewhat permanently deformed, its sealing end will always positively engage the corner part and therefore the sealing effect will not vary. In this respect, too, the durability will improve. Further, as it is not necessary to accurately position the valve seat and valve plate with each other, the cost is very low.

Further, in case the present invention is applied to a flange sealing means, it will be necessary to make the groove only in the upper flange, the upper surface of the lower flange need only be--1 made flat; no more work will be required and the cost will be very low. In case a guide plate is provided, the metal gasket will be hard to break at the sealing end, therefore the workability will be high and repeated use will be possible.

What is claimed is:

1. A sealing structure comprising: first and second rigid members spaced apart and comprising first and second surfaces, respectively, facing each other, said first surface on said first member being planar; a gasket formed as a closed ring with an outer perimeter generally axially displaced from an inner perimeter, whereby said gasket has a truncated, tapered shape and comprises first and second axially displaced sealing ends, each of said ends comprising a sharp edge formed as a closed loop in a plane substantially at each of said first and second sealing ends, respectively, said second surface on said second member comprising a groove facing said first member, said first end of said gasket being held in said groove; and a wall extending generally axially adjacent said second sealing end to receive an end region of said second sealing end when said first and second members are pressed against said ends of said gasket.

2. The sealing structure as defined in claim 1, wherein the cross-section of said gasket is in the shape of a parallelogram.

3. The sealing structure as defined in claim 1, in which the cross-sectional shape of said gasket is substantially rectangular.

4. The sealing structure as defined in claim 1, in which said groove is defined by substantially axial inner and outer walls and a generally transverse wall joining said inner and outer walls, said first end of said gasket being held within said groove to engage said outer wall, said inner wall comprising said generally axially extending wall adjacent said second sealing end.

5. The sealing structure as defined in claim 4, wherein the cross-section of said gasket is in the shape of a parallelogram, two of the surfaces of said parallelogram being substantially parallel to said inner and outer walls, the distance between said two surfaces of said parallelogram being sufficient to permit said surfaces to abut said inner and outer walls in the sealing position of said gasket.

6. The sealing structure as defined in claim 1 comprising an additional member attached to said first member and spaced from said first surface thereof toward said second member to engage said second member by pressure contact, said additional member comprising a peripheral wall forming said wall extending generally axially adjacent said second sealing end of said gasket.

7. The sealing structure as defined in claim 6 comprising, in addition, resilient means pressing said additional member away from said first member; and holding means limiting the maximum distance between said additional member and said first member.

8. The sealing structure as defined in claim 7 in which said additional member is a circular disc and said gasket is a circular ring, and said holding means comprises a bolt extending substantially axially through said disc, said disc being loosely mounted on said bolt.

9. The sealing structure as defined in claim 1 in which said first and second members are flanges, said structure comprising, in addition, an annular ring having a flat surface resting on said second surface of said second member and a surface substantially perpendicular to said second surface of said second member and constituting said wall extending generally axially adjacent said second sealing end of said gasket; and resilient means connecting said annular member to said first member between said first and second members.

* * * * *